Nov. 7, 1967 D. Y. S. CHIN 3,351,776

CONTROLLABLE TIMING CIRCUIT

Filed May 22, 1964

2 Sheets-Sheet 1

DANIEL Y.S. CHIN
INVENTOR

BY Alfred [signature]

ATTORNEY

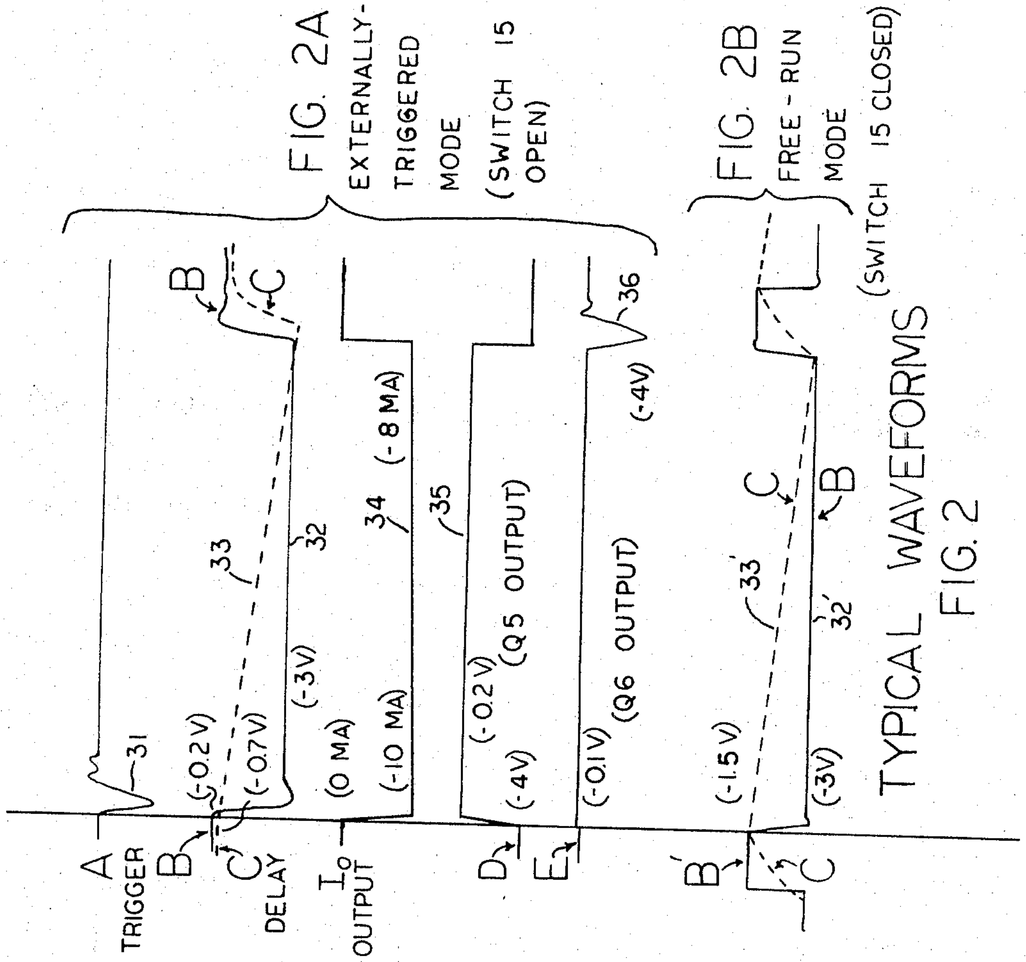
FIG. 2A, FIG. 2B, TYPICAL WAVEFORMS FIG. 2
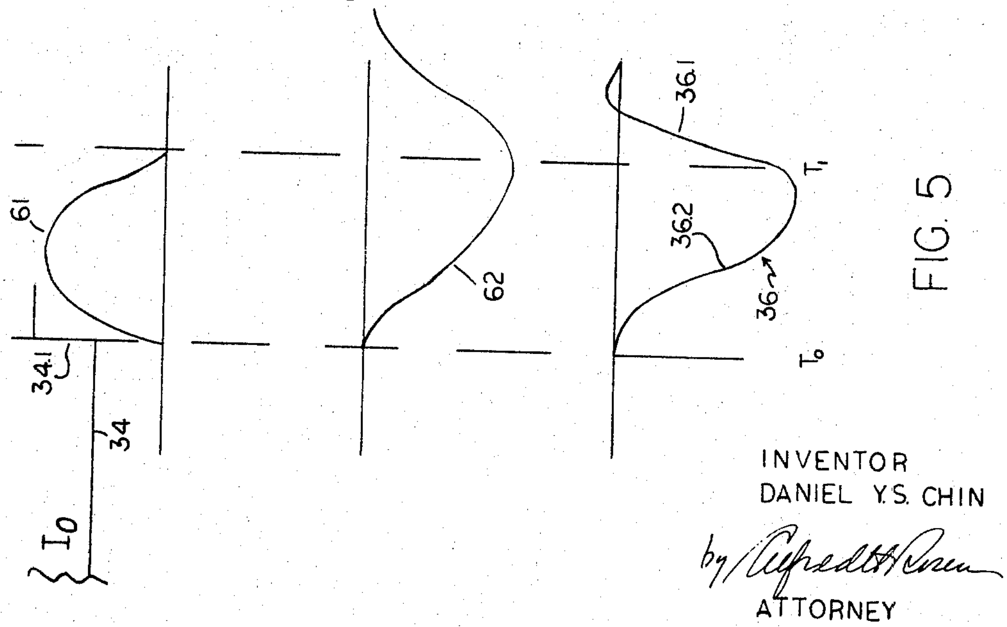
FIG. 5
INVENTOR
DANIEL Y.S. CHIN
by Alfred H. Rosen
ATTORNEY United States Patent Office 3,351,776

Patented Nov. 7, 1967

3,351,776
CONTROLLABLE TIMING CIRCUIT

Daniel Y. S. Chin, Northboro, Mass., assignor, by mesne assignments, to Honeywell Inc., a corporation of Delaware Filed May 22, 1964, Ser. No. 369,763
16 Claims. (Cl. 307—88.5)

ABSTRACT OF THE DISCLOSURE

An electronic timing circuit has a transistor pair arranged in a differential amplifier switch with one further transistor providing a two-level clamp at the input of one switch transistor and with a second further transistor, coupled to the first further transistor, controlling a capacitor charge that biases the other switch transistor.

This invention relates to electric wave timing circuits, and more particularly to such circuits capable of providing stable operation over wider ranges of time delays and wave frequencies than have heretofore been available, in any one of a wide choice of operating modes.

Multivibrators of the "single-shot" and "free-running" types are widely used in many applications, particularly in electronic digital data handling and/or computing systems. They are used, for example, in delay gate generators, pulse current generators, store exercisers, and other applications requiring a timing signal. As is known to those skilled in the arts of digital data handling systems and digital computing systems, the utility of electronic circuits providing timing waves or signals will depend, in a given case, upon one or more of a number of desired operating characteristics, such as the range of time delay that can be introduced between an input trigger and the output signal, the range of time durations of output signal that can be afforded, the range of frequencies of output waves that is available, the freedom with which one or more of these and/or other characteristics can be altered by manipulation of external controls, the choice of operating modes that is available, the choice of output modes that is available, the precision of operation, and the rapidity of response to a control signal, to cite some examples. It is a principal object of the present invention to provide an improved timing wave circuit affording numerous advantages over prior multivibrator and "single-shot" circuits. Among these advantages are:

(a) Stable operation over a wider range of delays—typically from about 20 nanoseconds to any reasonable maximum delay, which in practice may be 50 microseconds, or more;

(b) Stable operation over a wide range of frequencies—typically from few or several kilocycles to 20 megacycles or more;

(c) Rapid recovery for high duty cycles—typically 80% or more, in practice;

(d) Optional astable or monostable operation—typically controllable from a simple remote switch; and (e) A "free" output terminal configuration, allowing a choice among several output circuit configurations, and permitting these to have a convenient ground reference.

According to the invention there is provided electric timing wave generator circuit comprising for transistors $Q_1$, $Q_2$, $Q_3$ and $Q_4$, respectively; $Q_1$ being arranged to have an ON state in which its collector voltage is at a first level and an OFF state in which its collector voltage is at a second level negative by a fixed amount with respect to said first voltage level; $Q_2$ having its base coupled to $Q_1$ collector and its collector coupled to $Q_1$ base so that when $Q_2$ is ON $Q_1$ is ON, and when $Q_2$ is OFF $Q_1$ is OFF; the base of $Q_4$ being coupled to the collector of $Q_1$ so that when $Q_1$ is ON $Q_4$ is ON and when $Q_1$ is OFF $Q_4$ is OFF; the emitters of $Q_2$ and $Q_3$ being coupled together to a common current source so that anly one of them can draw current from said source at any one instant of time depending on the relative magnitudes of their respective base biases; the emitter of $Q_4$ being coupled to the base of $Q_3$ via a biasing connection containing resistance means such that $Q_4$ in the ON state applies to $Q_3$ base a bias voltage at a third voltage level intermediate said first and second levels whereby to hold $Q_3$ OFF when $Q_2$ is ON; and timing integrator means including capacitance means connected to said resistance means for charging said capacitance means through $Q_4$ when the latter is ON and for holding $Q_3$ ON for a predetermined period of time of discharge of said capacitance means through said resistance means, following an event which turns $Q_2$ OFF; said timing wave being the current through $Q_3$ when the latter is ON for said predetermined period of time.

According to additional features of the invention, the base of $Q_2$ may be coupled to the collector of $Q_1$ in such a manner that $Q_1$ in the OFF state can apply its collector voltage at the second level to latch $Q_2$ in the OFF state; the input portion of the circuit can be arranged to have mode-controlling means such that, optiionally, for monostable operation a pulse can be applied to the base of $Q_2$ to trigger the generation of a single timing wave, or, for astable free-running operation, a fixed voltage of suitable magnitude, under control of a simple switch, which can be remotely located, can be applied to the base of $Q_2$; the timing portion of the circuit can be controlled, again remotely if desired, to adjust the magnitude of the capacitance means of the timing integrator; and the output current wave can be applied to any of a large variety of output wave generating circuits, which latter can provide, for example, voltage waves of any desired shape or duration.

The foregoing and other objects and features of the invention will be apparent from the following description of certain embodiments of the invention. This description refers to the accompanying drawing, wherein:

FIG. 2 (both A and B) illustrates waveforms useful to explain the invention;

FIG. 5 illustrates waveforms useful to explain the operation of FIG. 4.

Figure 1:
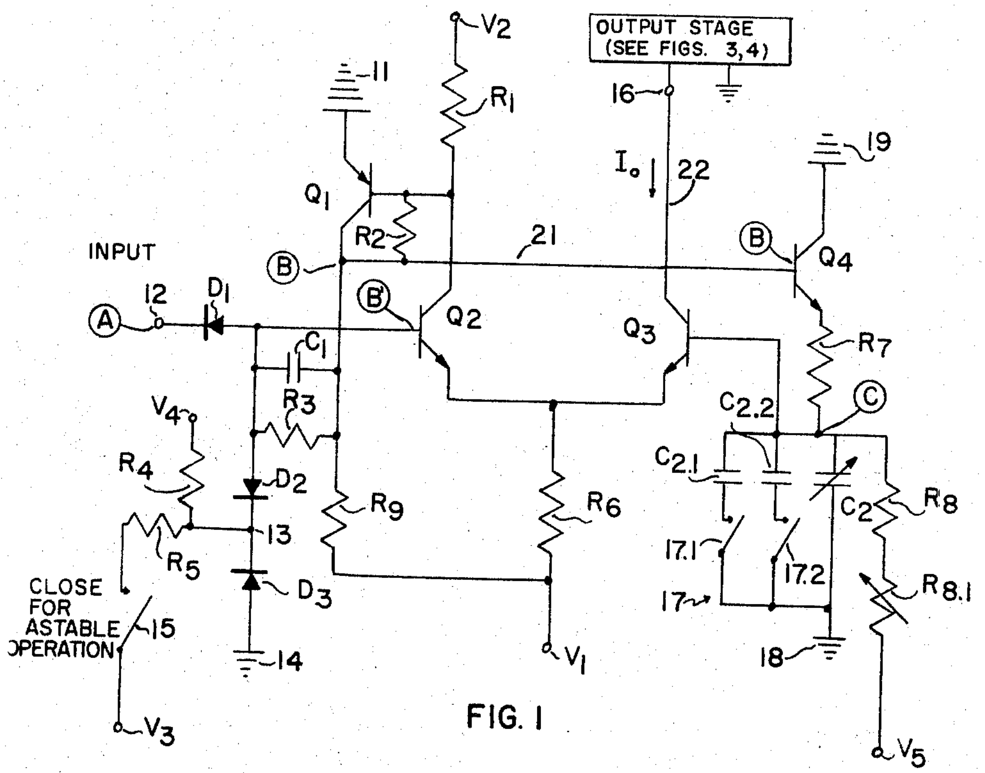
FIG. 1 is a schematic diagram of a circuit according to the invention.

The circuit of FIG. 1 comprises four transistors $Q_1$, $Q_2$, $Q_3$ and $Q_4$, together with their associated components. Transistors $Q_2$ and $Q_3$ are arranged in a differential amplifier configuration with their emitters connected together and via a common resistor $R_6$ to a voltage input terminal $V_1$. The collector of $Q_2$ is connected via resistor $R_1$ to a voltage input terminal $V_2$. Typical voltages applied at terminals $V_1$ and $V_2$ are (−)12 volts and (+)12 volts, respectively. Resistors $R_1$, $R_2$ and $R_9$ are connected in series between terminals $V_1$ and $V_2$. The collector of $Q_2$ is connected also to the base of $Q_1$, and resistor $R_2$ is connected between the base and collector of $Q_1$. The emitter of $Q_1$ is grounded at 11. An input signal terminal 12 is connected to the base of $Q_2$ via a diode $D_1$, poled with its cathode toward the terminal 12. Diodes $D_2$ and $D_3$ are connected in series, with their cathodes confronting at junction 13, between the base of $Q_2$ and ground at 14. Capacitor $C_1$ and resistor $R_3$ are connected in parallel between the collector of $Q_1$ and the base of $Q_2$. Resistor $R_4$ is connected between a voltage terminal $V_4$ and junction 13. Resistor $R_5$ is connected, via a switch 15 between a voltage terminal $V_3$ and junction 13. Typical voltages applied at terminals $V_3$ and $V_4$ are (−)12 volts and (+)12 volts, respectively. Typical values for resistors $R_4$ and $R_5$ are 100K and 1K, respectively.

The collector of $Q_3$ is connected to the output terminal 16. The base of $Q_3$ is connected to a resistance-capacitance bank forming a timing integrator, as generally indicated at 17. This bank comprises capacitance as represented by a variable capacitor $C_2$ and capacitors $C_{2.1}$ and $C_{2.2}$ with associated switches 17.1 and 17.2, respectively, and resistance as represented by resistor $R_8$ in series with a vernier resistor $R_{8.1}$. At one side, this bank is connected also to the emitter of $Q_4$ via resistor $R_7$. At the other side, the capacitor portion of this bank is grounded at 18 and the resistor branch is connected to a voltage terminal $V_5$. A typical voltage applicable at terminal $V_5$ is (−)12 volts. The collector of $Q_4$ is grounded at 19. The base of $Q_4$ is connected directly to the collector of $Q_1$ over line 21.

The functional operation of the circuit of FIG. 1 may be generally described as follows. $Q_2$ and $Q_3$ form a current-controlled pair sharing a common emitter current source ($R_6$). One or the other of these two transistors usually demands the total available emitter current, the other having no emitter current, as determined by the bias voltage conditions at their respective bases during operation. The collector of $Q_2$ forms the input current source for transistor $Q_1$, which is connected to be an operational amplifier with one or the other of two stable output voltages ((−)0.2 volt or (−)3 volts), as controlled by the $Q_2$ collector current. When $Q_2$ is "OFF," the $Q_1$ collector voltage is (−)3 volts, as determined essentially by the values of resistors $R_1$ and $R_2$. When $Q_2$ is "ON," its collector current exceeds the current available through $R_1$. The excess current is supplied from $Q_1$ base. The magnitude of this base current forces $Q_1$ to operate at a beta of approximately 10, thus causing $Q_1$ to saturate, and the $Q_1$ collector voltage rises to approach ground, at (−)0.2 volt. The switching time of $Q_1$, between these two states, is extremely fast (typical 2–3 nanoseconds) due to the advantageous bias drive current magnitudes allowed by this configuration. In the quiescent state, when $Q_1$ and $Q_2$ are both "ON," $Q_2$ collector demands about 12 milliamperes, about 10 milliamperes of which is supplied from $V_2$ via $R_1$, and about 1 or 2 milliamperes is supplied from $Q_1$ base. In this state the beta of $Q_1$ is about 10. When $Q_2$ is turned "OFF," the 10 milliamperes that came via $R_1$ goes into $Q_1$ base, causing a total change of current at $Q_1$ base from about 1 or 2 milliamperes out, to about 10 milliamperes in, or a change of about 12 milliamperes. Now the beta of $Q_1$ is about 2; because of this low beta, $Q_1$ turns off very fast. When $Q_1$ is "OFF," its collector goes to about (−)3 volts, and starts to draw current of about 10 milliamperes via $R_1$ and $R_2$. As a result, the greater portion of the current through $R_1$ goes to $Q_1$ collector via $R_2$, so that $Q_1$ again operates with about 1 or 2 milliamperes out of its base. This will be recognized as a negative feedback which tends to turn $Q_1$ back on; this negative feedback holds the collector of $Q_1$ at about (−)3 volts; this is the operational amplifier characteristics of the circuit of $Q_1$. Thus, when $Q_2$ switches OFF, $Q_1$ first switches fully nonconducting and then quickly conducts a small collector current; both of these conduction conditions are referred to herein as "OFF" in contrast to the considerably larger collector current $Q_1$ draws when $Q_2$ is ON. It will now be understood that this characteristic operates similarly in the opposite direction; that is, when $Q_2$ turns on again, there is again a change of about 12 milliamperes at $Q_1$ base, and $Q_1$ again operates at a beta of about 2, effecting fast turn-on. When $Q_1$ turns on full, most of the current drawn by its collector is fed back again to hold the base current to about 1 or 2 milliamperes.

The $Q_1$ collector voltage provides the feedback to the input of the circuit via capacitor $C_1$ and resistor $R_3$. The circuit can be operated in a first mode, with switch 15 open as shown, in which it is triggered at the input terminal 12 for monostable operation, or in a second mode, with the switch 15 closed (not shown), in which it runs free for astable operation. In the first mode, the feedback of $Q_1$ collector voltage provides latching after receipt of an input trigger signal at terminal 12. In the second mode, it provides alternating stable reference voltage levels ((−)0.2 volt and (−)3.0 volts) when the circuit is free running in astable operation.

The $Q_1$ collector voltage also drives the base of $Q_4$ as an emitter follower, which in turn controls the action of the timing integrator 17. The timing integrator in turn controls the base of $Q_3$, to complete the timing loop. The $Q_4$ base-emitter circuit disconnects at the start of a timing cycle, allowing the capacitor bank ($C_2$ etc.) to discharge at a rate determined by the RC time constant of the integrator 17. $Q_4$ also recharges the capacitor bank rapidly at the end of a timing cycle, providing the circuit with rapid recovery characteristics, and allowing high duty cycles in excess of 80%. As will be explained below in connection with FIG. 2, the delay of the circuit, or time duration of an output wave available at the output terminal 16, is controlled by the capacitance ($C_2$, etc.) and resistance ($R_8$, $R_{8.1}$) of the timing integrator 17. In practice, the resistance is adjustable for vernier delay control via $R_{8.1}$, and the bank of capacitors $C_2$, $C_{2.1}$ and $C_{2.2}$ is adjusted via switches 17.1 and 17.2 to determine the time delay range, which can be adjusted also via the variable capacitor $C_2$, if desired.

Figure 4:
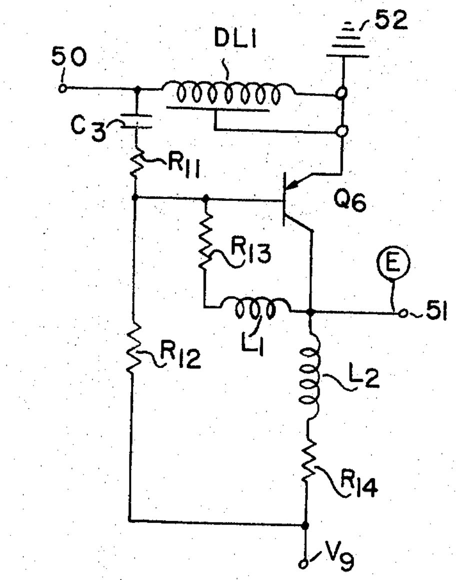
FIGS. 3 and 4 are schematic diagrams of output voltage wave generators.
Figure 3:
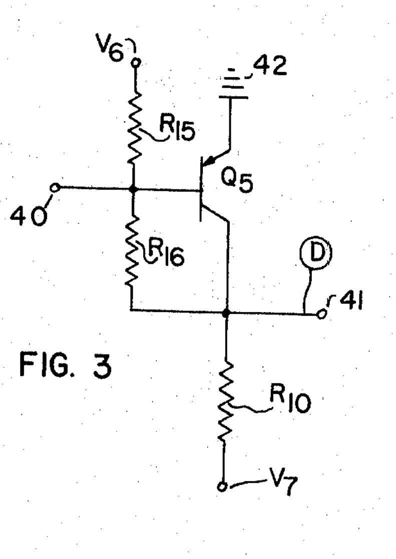

The collector of $Q_3$ is the timing circuit output, at terminal 16, and this is available for connection to other circuits as desired; two exemplary circuits are illustrated in FIGS. 3 and 4.

The network comprised of switch 15, resistors $R_4$ and $R_5$, and diodes $D_2$ and $D_3$, provides the capability of switching from monostable externally-triggered operation (switch 15 open) to astable internally free-running operation (switch 15 closed). For this purpose the diode $D_3$ is preferably a silicon diode (or a plurality of diodes may be used in series) having a suitable voltage drop in the forward-biased state so that it can be used as a low-voltage reference element. A forward drop of about 0.7 volt per diode is useful.

Typical values for the components of a circuit according to FIG. 1 may be approximately as follows:

| | |
|---|---|
| $R_1$=2,000Ω | $R_6$=1,400Ω |
| $R_2$=450Ω | $R_7$=20Ω |
| $R_3$=250Ω | $R_8$=1,500Ω |
| $R_4$=100,000Ω | $R_{8.1}$=10,000Ω |
| $R_5$=1,000Ω | $R_9$=600Ω |

$C_1$=30 pf.
$C_2$=determined by the desired timing period; typical range=30 pf. to 0.1 μf.
Transistors $Q_2$, $Q_3$ and $Q_4$ may be 2N708
Transistor $Q_1$ may be 2N965.

Referring to FIGS. 1 and 2 together, the operation of the invention in the triggered monostable mode is as follows.

The input trigger is a negative-going pulse 31 as shown at A in FIG. 2A, applied at the input terminal 12. This pulse should be shorter than the timing period of the circuit of FIG. 1. In the applied-voltage conditions stated above, this pulse should be at least (−)1.5 volts. Suitable voltages are similarly indicated elsewhere in FIG. 2.

In the quiescent state of the circuit of FIG. 1, prior to the application of the trigger pulse 31, $Q_1$ is on full (i.e., "satrurated"), $Q_2$ is on full, $Q_3$ is off, $Q_4$ is on; $I_0$ (the output current at the output terminal 16) is 0 (milliamperes); the input terminal 12 is at ground potential; diode $D_2$ is reverse-biased; and the base of $Q_3$ is at about (−)1 volt. Diode $D_3$ is also reverse-biased, the switch 15 being open. Immediately after application of the trigger pulse 31, diode $D_1$ turns on, making the base of $Q_2$ negative. This causes $Q_2$ to turn off, which in turn causes $Q_1$ to turn off. The turning off of $Q_1$ sets its collector voltage at (−)3 volts, and sets the base of $Q_4$ at the same voltage over line 21. $Q_4$ thus turns off, since its emitter voltage falls at a slower rate determined by the timing integrator 17. The voltage in this portion of the timing period on line 21 is indicated by curve 32 at B in FIG. 2A. The slower drop of voltage at the emitter of $Q_4$ in this portion of the timing period is indicated by the dashed-line curve 33 at C in FIG. 2A.

The drop in voltage of the collector of $Q_1$ is determined in part by the base-collector resistor $R_2$; this is the operational amplifier effect referred to above. The base of $Q_2$ will follow the $Q_1$ collector voltage, since no current passes through $R_3$ at this time. As is mentioned above, the $Q_1$ collector falls to about (−)3 volts, as determined by resistors $R_1$ and $R_2$.

During the timing period, $Q_1$, $Q_2$ and $Q_4$ are off; $Q_3$ is on; and the magnitude of the output current $I_0$ is determined by the emitter voltage of $Q_3$ and by resistor $R_6$. $I_0$ goes in a "negative" direction (indicated by the arrow 22 in FIG. 1), becoming approximately (−)10 milliamperes, and its amplitude decreases during the timing period to approximately (−)8 milliamperes, as is represented by curve 34 in FIG. 2A, since the base voltage of $Q_3$ is falling as a result of the current through $R_8$ and $R_{8.1}$ discharging the capacitor bank $C_2$ (and $C_{2.1}$ and/or $C_{2.2}$, if connected) of the timing integrator 17, as represented by curve 33 in FIG. 2A. It will be understood that the reason why the amplitude of $I_0$ decreases from (−)10 milliamperes to (−)8 milliamperes (curve 34) is that as $C_2$ discharges the voltage at $Q_3$ base drops, and the voltage at $Q_3$ emitter drops to follow the base voltage; hence the voltage across $R_6$ drops, and as a result the current through $Q_3$ emitter drops in magnitude accordingly. The voltage at the base of $Q_3$ falls until it matches the base voltage of $Q_2$. The circuit of FIG. 1 now switches to the recovery phase, where $Q_2$ turns on turning on $Q_1$ and $Q_4$; and $Q_3$ turns off.

During the recovery phase, the turning off of $Q_3$ shuts off the output current $I_0$, terminating the timed output current wave 34 in FIG. 2A. The regenerative turn-on connection of $Q_1$ and $Q_2$ quickly saturates these two transistors; and $Q_4$ turning on recharges the capacitor bank of the timing integrator 17 to its quiescent voltage. The base-emitter voltage of $Q_4$, and the voltage drop due to resistor $R_7$, insure that the base of $Q_3$ is more negative than the base of $Q_2$, thereby insuring that $Q_3$ remains off. The circuit of FIG. 1 is now in the quiescent state, and ready again to be triggered by an input pulse 31.

For astable operation in a free-running mode, the switch 15 is closed, thus turning on diode $D_3$, and putting a clamp on the base voltage of $Q_2$, holding it more negative than about (−)1.5 volts. This is due to the fact that resistor $R_4$ is much larger than resistor $R_5$ (about 100/1). Desirably, the drop across diode $D_3$ is about 2 volts (for which purpose three silicon diodes may be used in series). This places junction 13 and the cathode of diode $D_2$ at about (−)2 volts. The base of $Q_2$ can then never go more positive than the drop across the single diode $D_2$, which is about 0.7 volt, so that the base of $Q_2$ is clamped at about (−)1.5 volts, as is indicated at B′ in FIG. 2B. At this voltage, $Q_2$ base is more negative than $Q_3$ base, which latter, it will be recalled, was held, in the quiescent state, more negative than $Q_2$ base. The voltage at $Q_3$ base, in the quiescent state, is therefore established at a value between about (−)0.2 volt and about (−)1.5 volts (typically, about (−)1 volt). Under astable conditions, when the switch 15 is closed, $Q_2$ base is prevented from becoming more positive than (−)1.5 volts. Since $Q_3$ base tries to rise to (−)1 volt (more positive than (−)1.5 volts), $Q_3$ turns on and $Q_2$ turns off, restarting a timing cycle illustrated by curves 32′ and 33′ in FIG. 2B. Free-running will continue until the clamping voltage is removed from the base of $Q_2$ by opening the switch 15.

FIG. 3 illustrates an output circuit which produces a positive gate voltage, as represented by curve 35, at D, in FIG. 2A. The input terminal 40 will be connected to the output terminal 16 of FIG. 1, so that the output current $I_0$ may be drawn from the base of transistor $Q_5$. The emitter of $Q_5$ is grounded at 42, and the collector is connected to a voltage terminal $V_7$ via a resistor $R_{10}$. A typical voltage at terminal $V_7$ is (−)12 volts. The collector of $Q_5$ is connected also to the output terminal 41, at which the wave D (FIG. 2A) appears. A resistor $R_{16}$ is connected between the base and collector of $Q_5$. A resistor $R_{15}$ is connected from the $Q_5$ base to a voltage terminal $V_6$. A typical voltage at the latter terminal is (+)12 volts. Transistor $Q_5$ may typically be a type 2N965 fast-switching transistor, and the resistors may have the following typical values:

| | |
|---|---|
| $R_{10}$ | 470Ω |
| $R_{15}$ | 1500Ω |
| $R_{16}$ | 450Ω |

In the quiescent state, with these parameters, the collector is at equilibrium at approximately (−)4 volts. When a current of about 10 milliamperes is drawn from the base junction of $Q_5$ via the output terminal 16 of FIG. 1 during the timing interval (curve 34 in FIG. 2A), the transistor goes into saturation, current through $R_{16}$ goes substantially to zero, and the collector voltage goes very close to ground, here about (−)0.2 volt, as shown at curve 35 in FIG. 2A. The configuration of FIG. 3 will be recognized as an operational amplifier which converts an input current to an output voltage.

FIG. 4 illustrates another output circuit, which produces a negative-going output voltage pulse at the end of the timing interval of FIG. 1, as is represented by curve 36, at E, in FIG. 2A. The input terminal 50 which will be connected to the output terminal 16 of FIG. 1, is connected to ground at 52 through a delay line DL1. One end of the delay line is connected to the ground 52 and the other end, which is connected to the input terminal 50, is connected also through a capacitor $C_3$ and resistor $R_{11}$ in series to the base of transistor $Q_6$. The $Q_6$ base is connected also to a voltage terminal $V_9$ via a resistor $R_{12}$. A typical voltage at this terminal $V_9$ is (−)12 volts. The emitter of $Q_6$ is connected to ground at 52, and the collector is connected to the voltage terminal $V_9$ via an inductor L2 and a resistor $R_{14}$, in series, and directly to the output terminal 51. The base of $Q_6$ is connected to its collector via a resistor $R_{13}$ and an inductor L1, in series.

The output current at terminal 16 in FIG. 1 traverses the shorted delay line DL1, which is A.C. terminated via the capacitor $C_3$ and resistor $R_{11}$ into the base of $Q_6$ as a saturated inverter. The initial negative-going edge of the output current wave from FIG. 1 (curve 34 in FIG. 2A) draws current from the base of transistor $Q_6$, thus forcing it toward increased saturation. The positive-going end of the output current wave 34 causes a positive current pulse into the base of transistor $Q_6$, thus turning off this transistor for the period of two (2) delay line lengths of the delay line DL1. The output, at terminal 51, is the negative pulse 36 (FIG. 2A) which is negative-going from about ground to an amplitude of about (−)3 volts. The inductors L1 and L2 are for pulse shaping, as may be understood from the following explanation with reference to FIG. 5.

In FIG. 5, the trailing edge 34.1 of curve 34 is shown at time $T_0$, representing the instant when the positive-going end of $I_0$ is applied at the input terminal 50 of FIG. 4. The time interval from $T_0$ to $T_1$ is two delay-line lengths for DL1. Curve 61 represents the positive pulse which is applied from the delay line over $C_3$ and $R_{11}$ to $Q_6$ base, holding $Q_6$ shut off for this time interval $T_0$ to $T_1$. The first inductor L1 delays the negative-going wave (represented by curve 62) from $Q_6$ collector, which is applied to $Q_6$ base as feedback current via $R_{13}$, so that the negative peak of this latter wave 62 substantially coincides in time at the base of $Q_6$ with the end of the wave 61 from the delay line DL1. The effect of this delay is to slow the feedback current from $Q_6$ collector to $Q_6$ base until after the input wave 61 has occurred, thus allowing less negative feedback or reduction of the input pulse waveform until the input pulse is ended. This sequence of events at $Q_6$ base facilitates fast turn-on of $Q_6$, in that the positive-going wave 61 from DL1 essentially vanishes at the same time that feedback from $Q_6$ collector becomes maximum negative. As a result, the $Q_6$ collector waveform, approximately represented by curve 36, returns very quickly to ground, as is indicated at the portion 36.1 of curve 36 to the right of time axis $T_1$. This is the output pulse 36 shown at E in FIG. 2A.

The second inductor L2 is used to store energy in the form of a current while $Q_6$ is "ON." When $Q_6$ is turned "OFF," the collapse of the magnetic field around L2 drives $Q_6$ collector in a negative-going direction, as is illustrated at 36.2 in curve 36, between time axes $T_0$ and $T_1$. This serves to sharpen the leading edge of the output pulse. Thus, inductor L2 serves to sharpen the leading edge of the output pulse 36, while inductor L1 serves to sharpen its trailing edge.

It is characteristic of the invention that its control parameters can be set by means remote from the circuit itself. Thus, in FIG. 1 for example, the switches 17.1 and 17.2 in the timing integrator 17 can be located a short distance from the remainder of the circuit on the front panel of its housing. The vernier resistor $R_{8.1}$ can be located still further away. At the input end of the circuit, the mode selection switch 15 can be located any desired distance from the remainder of the circuit. Moreover, the output wave is a current wave which may be freely connected to a number of optional output configurations to provide a voltage having charasteristics which can be chosen independently of the form and characteristics of the output wave.

The embodiment of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. Electrical timing wave generator circuit comprising four transistors $Q_1$, $Q_2$, $Q_3$ and $Q_4$, respectively; means to bias $Q_1$ to have an ON state in which its collector voltage is at a first level and an OFF state in which its collector voltage is at a second level negative by a fixed amount with respect to said first voltage level; $Q_2$ having its base coupled to $Q_1$ collector and its collector coupled to $Q_1$ base; said means to bias $Q_1$ being adjusted so that when $Q_2$ is ON $Q_1$ is ON, and when $Q_2$ is OFF $Q_1$ is OFF; the base of $Q_4$ being coupled to the collector of $Q_1$; means to bias $Q_4$ so that when $Q_1$ is ON $Q_4$ is ON and when $Q_1$ is OFF $Q_4$ is OFF; the emitters of $Q_2$ and $Q_3$ being coupled together to a common current source; means to base-bias $Q_2$ and $Q_3$ so that only one of them can draw current from said source at any one instant of time depending on the relative magnitudes of their respective base biases; the emitter of $Q_4$ being coupled to the base of $Q_3$ via a biasing connection containing resistance means such that $Q_4$ in the ON state applies to $Q_3$ base a bias voltage at a third voltage level intermediate said first and second levels whereby to hold $Q_3$ OFF when $Q_2$ is ON; and timing integrator means including capacitance means connected to said resistance means for charging said capacitance means through $Q_4$ when the latter is ON and for holding $Q_3$ ON for a predetermined period of time of discharge of said capacitance means through said resistance means, following an event which turns $Q_2$ OFF; said timing wave being the current through $Q_3$ when the latter is ON for said predetermined period of time.

2. Electric timing wave generator circuit comprising four transistors $Q_1$, $Q_2$, $Q_3$ and $Q_4$, respectively; means to bias $Q_1$ to have an ON state in which its collector voltage is at a first level and an OFF state in which its collector voltage is at a second level negative by a fixed amount with respect to said first voltage level; $Q_2$ having its base coupled to $Q_1$ collector via a network having resistance and capacitance in parallel and its collector connected directly to $Q_1$ base; said means to bias $Q_1$ being adjusted so that when $Q_2$ is ON $Q_1$ is ON, and when $Q_2$ is OFF $Q_1$ is OFF, and so that $Q_1$ in the OFF state can apply its collector voltage at said second level to latch $Q_2$ in the OFF state; the base of $Q_4$ being coupled to the collector of $Q_1$; means to bias $Q_4$ so that when $Q_1$ is ON $Q_4$ is ON and when $Q_1$ is OFF $Q_4$ is OFF; the emitters of $Q_2$ and $Q_3$ being coupled together to a common current source; means to base-bias $Q_2$ and $Q_3$ so that only one of them can draw current from said source at any one instant of time depending on the relative magnitudes of their respective base biases; the emitter of $Q_4$ being coupled to the base of $Q_3$ via a biasing connection containing resistance means such that $Q_4$ in the ON state applies to $Q_3$ base a bias voltage at a third voltage level intermediate said first and second levels whereby to hold $Q_3$ OFF when $Q_2$ is ON; and timing integrator means including capacitance means connected to said resistance means for charging said capacitance means through $Q_4$ when the latter is ON and for holding $Q_3$ ON for a predetermined period of time of discharge of said capacitance means through said resistance means, following an event which turns $Q_2$ OFF; said timing wave being the current through $Q_3$ when the latter is ON for said predetermined period of time.

3. A circuit according to claim 1, having mode-controlling means coupled to the base of $Q_2$, said means comprising an input terminal whereby to apply a negative-going pulse to said base, and means optionally to apply a fixed negative voltage to said base intermediate said second and third voltage levels whereby to set said circuit in a free-running astable mode.

4. A circuit according to claim 3 in which said optional means includes diode means, resistance means and a switch, said switch when closed connecting means to bias said diode means to conduct, said diode means having a prescribed voltage drop when conductive, and means to apply said voltage drop to the base of $Q_2$ to establish said fixed negative voltage at said base.

5. A circuit according to claim 1 in which said timing integrator means includes a capacitance branch between $Q_3$ base and ground, a resistance branch between $Q_3$ base and a terminal for the aplication of a negative bias voltage, and resistance means between $Q_3$ base and $Q_4$ emitter, and $Q_4$ collector is connected to ground, whereby when $Q_4$ is ON said capacitance branch is charged through $Q_4$ and when $Q_4$ is OFF said capacitance branch is discharged through said resistance branch, the resistance of said resistance branch being larger than the resistance of said resistance means.

6. A circuit according to claim 5 in which said capacitor branch includes at least two capacitors in parallel, all but one of said capacitors having switch means in series between the capacitor and the ground connection.

7. A circuit according to claim 5 in which the resistance branch has variable resistance means in it.

8. A circuit according to claim 1 in combination with output voltage generating means coupled to the collector of $Q_3$.

9. A circuit according to claim 8 in which the output voltage generating means comprises a fifth transistor $Q_5$ having its base connected to the collector of $Q_3$, and its emitter grounded, a voltage-divider comprising first, second and third resistors and means for connection at the free end of the first resistor to a source of positive voltage and at the free end of the third resistor to a source of negative voltage, the base of $Q_5$ being connected to the junction of the first and second resistors, the collector of $Q_5$ being connected to the junction of the second and third resistors, and an output for the generated voltage connected to said last-named junction.

10. A circuit according to claim 8 in which the output voltage generating circuit provides a negative-going voltage pulse at the end of said timing wave, said output voltage generating circuit comprising a fifth transistor $Q_6$, a delay line connected at a first end to the collector of $Q_3$ and at the second end to ground and to the emitter of $Q_6$, said first end being connected through a series path of resistance and capacitance to the base of $Q_6$, the base of $Q_6$ being connected through a series path of resistance and inductance to the collector of $Q_6$, an output voltage terminal connected to the collector of $Q_6$, said collector being also connected through a second series path of resistance and inductance to a voltage terminal for connection to a source of negative voltage, and resistance means connected between the base of $Q_6$ and said voltage terminal.

11. A circuit according to claim 1 in combination with a delay line having first and second terminals coupled at the first terminal to the collector of $Q_3$, a fifth transistor $Q_6$, a coupling between said first terminal and the base of $Q_6$, and a coupling between said second terminal and the emitter of $Q_6$, at least one of said couplings having D.C. isolating A.C. coupling means therein.

12. A circuit for generating an electric wave of a prescribed form in response to a change in a prescribed direction of an applied signal wave comprising a delay line having first and second terminals with a prescribed delay between them, means to apply said signal wave to said first terminal, a transistor having emitter, base and collector electrodes, third and fourth terminal means for applying a voltage across said emitter and collector electrodes, respectively, said second terminal being coupled to said third terminal means, a coupling including D.C. isolating means between said first terminal and said base electrode, and a feed-back path including inductance between said collector and base electrodes, said inductance serving to delay feedback to said base electrode by a time equal approximately to twice the delay-length of said delay line.

13. A circuit according to claim 12 including inductance between said fourth terminal means and said collector electrode.

14. An electrical timing circuit comprising:

(A) second and third transistor devices arranged in a differential amplifier configuration, (B) circuit means for applying to the base of said second transistor an input signal that normally causes conduction thereof to assume a first condition, (C) a first transistor device (1) having a junction thereof in circuit with a junction of said second transistor, said junction of each of said first and second transistors that is in circuit with the other of said first and second transistors including a transistor base, (2) including means to change the conduction thereof between third and fourth conditions in response to the change in the conduction of said second transistor between said first conduction condition and a second conduction condition, and when in said third condition, to hold the base of said second transistor at a level that tends to maintain said first conduction condition in said second transistor, (D) first resistor means, (E) first capacitor means (1) arranged to be discharged through first resistor means, and (2) in circuit with the base of said third transistor device to bias said third transistor device in responsive to the charge on said capacitor means, and (F) a fourth transistor device arranged selectively to charge said first capacitor means when said first transistor device is in said fourth conduction condition.

15. An electrical timing circuit comprising:

(A) second and third transistor devices arranged in a differential amplifier configuration, (B) first resistor means, (C) first capacitor means arranged to be discharged through said first resistor means, (D) said third transistor device having the base thereof in circuit with said first capacitor means and arranged to be biased in response to the charge thereon, (E) a parallel resistor-capacitor network, (F) a first transistor device arranged with the collector-base junction thereof in series with said resistor-capacitor network between the collector and base of said second transistor device, (G) a further resistor in circuit between the collector and base of said first transistor, and (H) a fourth transistor device arranged selectively to charge said first capacitor means when said first transistor device is in a selected conduction state.

16. A circuit according to claim 15 further comprising:

(A) circuit means arranged to apply to the base of said second transistor an input signal that normally changes the conduction condition of said second transistor from a second condition to a first condition, and (B) output means coupled to the collector of said third transistor device.

References Cited

UNITED STATES PATENTS

| | | | |
|---|---|---|---|
| 2,623,998 | 12/1952 | Emanuelsson | 328—58 X |
| 2,707,751 | 5/1955 | Hance | 328—58 |
| 2,949,545 | 8/1960 | White | 307—88.5 |
| 2,949,549 | 8/1960 | Hoge | 307—88.5 |
| 3,037,132 | 5/1962 | Skerritt | 307—88.5 |
| 3,089,040 | 5/1963 | Hovey | 307—88.5 |
| 3,231,765 | 1/1966 | Martin et al. | 307—88.5 |

JOHN S. HEYMAN, *Primary Examiner.*

ARTHUR GAUSS, *Examiner.*